US010452503B2

(12) United States Patent
Abouelwafa et al.

(10) Patent No.: US 10,452,503 B2
(45) Date of Patent: Oct. 22, 2019

(54) BIDIRECTIONAL REPLICATION

(71) Applicant: HEWLETT PACKARD ENTERPRISE DEVELOPMENT LP, Houston, TX (US)

(72) Inventors: Ayman Abouelwafa, Folsom, CA (US); Douglas L Voigt, Boise, ID (US); Alex Veprinsky, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/721,284

(22) Filed: Sep. 29, 2017

(65) Prior Publication Data

US 2019/0102269 A1    Apr. 4, 2019

(51) Int. Cl.
*G06F 12/00*       (2006.01)
*G06F 11/20*       (2006.01)
(Continued)

(52) U.S. Cl.
CPC .......... *G06F 11/2079* (2013.01); *G06F 3/061* (2013.01); *G06F 3/065* (2013.01); *G06F 3/067* (2013.01); *G06F 3/0665* (2013.01); *G06F 11/2069* (2013.01); *H04L 67/1095* (2013.01); *G06F 11/1448* (2013.01); *G06F 11/2007* (2013.01); *G06F 2201/82* (2013.01)

(58) Field of Classification Search
CPC ............. G06F 11/1448; G06F 11/2007; G06F 11/2069; G06F 11/2079; G06F 3/0665; G06F 3/0646; G06F 3/0647; G06F 3/065; G06F 2201/82; G06F 12/0802; G06F 12/0806; H04L 67/1095
See application file for complete search history.

(56) References Cited

U.S. PATENT DOCUMENTS 6,996,672 B2   2/2006 Lubbers et al.
7,058,848 B2   6/2006 Sicola et al.
(Continued)

FOREIGN PATENT DOCUMENTS

WO    WO-2016/209313    12/2016

OTHER PUBLICATIONS

Extended European Search Report received in EP Application No. 17207612.7, dated Jun. 8, 2018, 9 pages.
(Continued)

*Primary Examiner* — Shawn X Gu
(74) *Attorney, Agent, or Firm* — Hewlett Packard Enterprise Patent Department

(57) ABSTRACT

An example data storage system includes a first storage array having a first LUN and a second storage array having a second LUN. The first and second storage arrays may implement replication from the first LUN as a primary LUN to the second LUN as a secondary LUN. The first and second LUNs may both be an active target for host write I/O. The second storage array may, in response to receiving from a host a write that is directed to the second LUN, send write data of the write to the first storage for replication array while maintaining a copy of the write data in a fenced portion of a cache of the second storage array. The second storage array may wait to release the copy of the write data to the second LUN until a write acknowledgment is received from the first storage array.

17 Claims, 4 Drawing Sheets

(51) Int. Cl.
*G06F 3/06* (2006.01)
*H04L 29/08* (2006.01)
*G06F 11/14* (2006.01)

(56) References Cited

U.S. PATENT DOCUMENTS

| | | |
|---|---|---|
| 8,375,184 B2 * | 2/2013 | Kumar ................ G06F 11/2089 |
| | | 711/114 |
| 9,032,170 B2 | 5/2015 | Vaghani et al. |
| 9,477,424 B1 | 10/2016 | Verma |
| 9,563,517 B1 | 2/2017 | Natanzon et al. |
| 2011/0093862 A1 | 4/2011 | Doatmas et al. |
| 2014/0136776 A1 | 5/2014 | Elkington et al. |
| 2017/0068450 A1 | 3/2017 | Candelaria et al. |

OTHER PUBLICATIONS

Dell Inc., "EMC Unity: Replication Technologies," (Research Paper), White Paper, Dec. 2, 2016, 39 pages, https://www.emc.com/collateral/white-papers/h15088-emc-unity-replication-technologies.pdf.

* cited by examiner

BIDIRECTIONAL REPLICATION

BACKGROUND

Some data storage systems may implement a replication functionality. Replication comprises continually duplicating in real time one storage volume to another storage volume. Replication may differ from merely copying or backing-up one storage volume to another volume in that replication implies an on-going link between the volumes, such that, as changes and new writes are made to the one volume, the other volume is also updated with the same.

For example, in one replication arrangement, a first volume of a first storage array is replicated to a second volume of a second storage array. In this example, the first volume may be read from and written to by hosts via the first array, while the second volume may be read from by hosts via the second array but may not be written to by hosts. When a write request is received by the first array, the first array writes the data to the first volume while also sending a copy of the data over a replication channel to the second array for storing in the second volume.

Replication is often used to mitigate the risk of data loss. For example, if one of the volumes in a replication relationship were to fail, then the data stored therein would not be permanently lost because it would be available on the other volume of the replication relationship.

DETAILED DESCRIPTION

1—Replication Related Definitions

Figure 1:
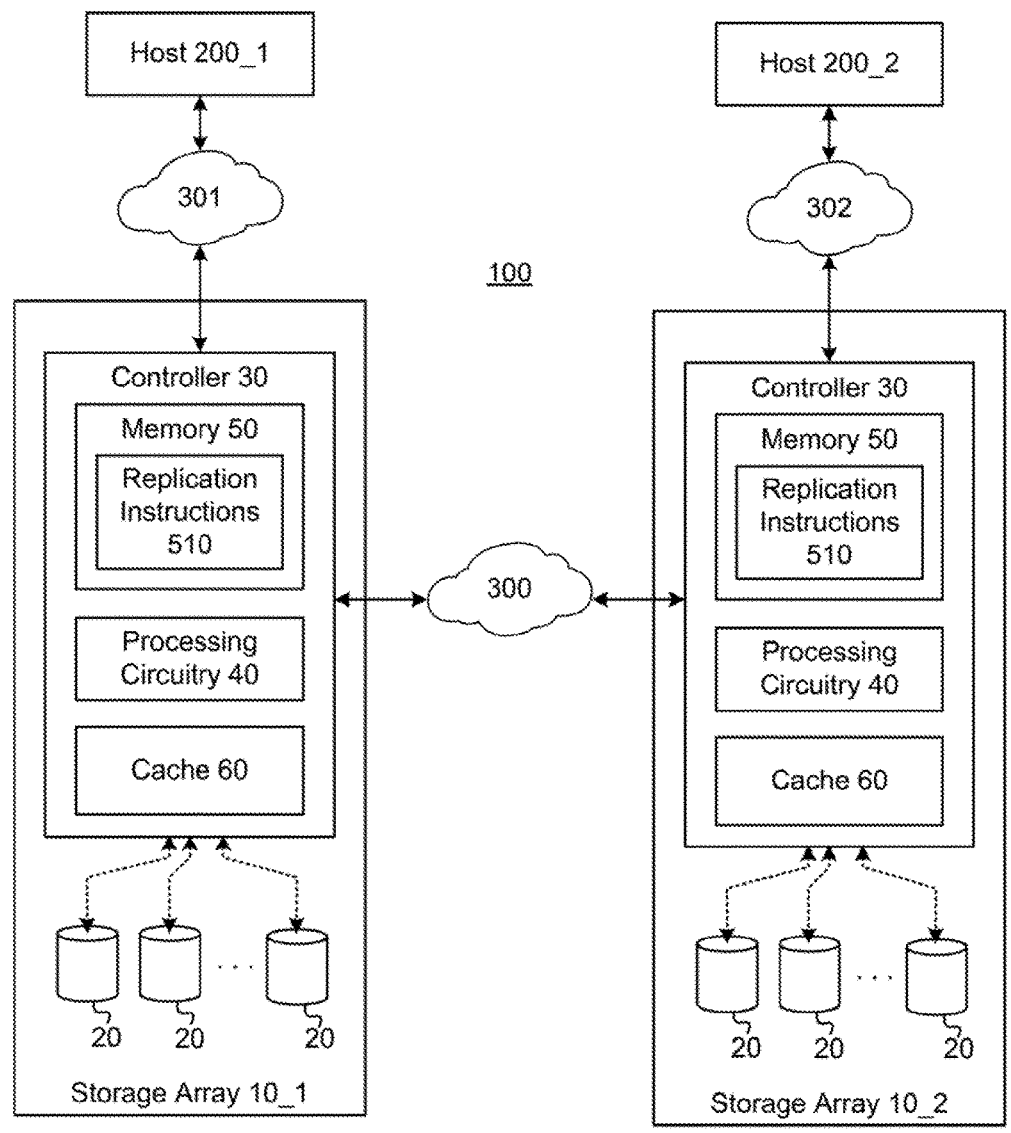
FIG. 1 illustrates an example storage system that includes two example storage arrays implementing an example bidirectional replication.

Storage array. As used herein, a storage array is any system (device or combination of devices) that includes at least one data storage device and processing circuitry to control storage input/output ("I/O") to the at least one data storage device. This may include systems that are commonly referred to as storage arrays, such as a system with many storage devices that implement a redundant array of independent disks (RAID), but may also include systems that might not normally be referred to as storage arrays, such as a computer with a single storage device.

Host. As used herein, "host" means any entity, physical or virtual, that sends I/O requests (commands) to a storage array. For example, a host may include a computer, a virtual machine, a piece of dedicated hardware (e.g., a host adaptor), a software program that is being executed by a processor, etc.

LUN. As used herein, "LUN" means a logical storage volume that is addressable to a host. This may include logical storage volumes that are commonly referred to as LUNs, such as the "logical units" of the Small Computer Systems Interface (SCSI) family of protocols, but may also include logical storage volumes that might not normally be referred to as LUNs.

Controller. As used herein, "controller" refers to processing circuitry of a storage array that is to manage access to storage devices of the array, including forming LUNs from the storage space of the storage devices and presenting the LUNs to hosts as available targets for storage I/O. This may include entities that are commonly referred to as a controller, such as a RAID controller, but may also include entities that might not normally be referred to as a controller, such as a general purpose processor executing instructions stored on a machine-readable medium.

Replication. As used herein, "replication" refers to continually (i.e., on an on-going basis) duplicating changes that occur in one LUN to one or more other LUN(s). Thus, "implementing replication" from a first volume to a second volume means enacting on-going processes and/or policies that cause content changes to the first volume to automatically be duplicated to the second volume. The content changes may be duplicated synchronously in some implementations or asynchronously in other implementations.

Replication set. As used herein, "replication set" refers to a collection of two or more LUNs that have a replication relationship with one another. The replication relationship may be a one-way replication relationship (e.g., host writes to a first LUN are replicated to a second LUN) or a bidirectional replication relationship (e.g., host writes to a first LUN are replicated to a second LUN, and host writes to the second LUN are also replicated to the first LUN). Although the description herein will focus mainly on examples in which there are two LUNs in the replication set for ease of understanding, it should be understood that a single replication set may include more than two LUNs.

Primary LUN and secondary LUN. As used herein, "primary LUN" refers to the LUN of a replication set that leads write operations for the replication set, while "secondary LUN" refers to any LUN of the replication set that follows write operations for the replication set. In other words, if a replication set has a primary LUN and secondary LUN(s), this means that any host write directed to any LUN of the replication set is always committed to the primary LUN before it is committed to any secondary LUNs.

Primary array and secondary array. As used herein, "primary array" and "secondary array" are designations that are used when speaking about a specific replication set, and are dependent on that replication set. In particular, when speaking about a given replication set, the storage array that includes the primary LUN of the replication set is the "primary array" while the other array(s) may be referred to as the "secondary array(s)". The same storage array may be considered as both the primary array in relation to one replication set and the secondary array in relation to another replication set. For example, a single array may include a first LUN that is the primary LUN of one replication set and a second LUN that is a secondary LUN from another replication set, and thus the array would be considered the primary array for the first replication set and simultaneously would be considered the secondary array of the second replication set.

As used herein, the terms "primary" and "secondary" do not imply anything about the LUNs and/or arrays besides what is stated in the definitions above. In particular, although some existing replication technologies may include entities referred to as a "primary LUN", a "primary array", a "secondary LUN", and a "secondary array", the entities referred to herein by the these terms are not necessarily similar to the entities of the other replication technologies that share the same name. Thus, the entities described herein may (A) include some features/attributes that the entities having the same name in other replication technologies do not have, and (B) omit some features/attributes that are had by entities having the same name in other replication technologies.

2—Example Bidirectional Replication Technologies: Overview

In examples disclosed herein, example bidirectional replication technologies are provided that enable, among other things, both primary and secondary arrays of a replication set to receive and process host writes as active targets. In particular, in these examples, the secondary array may be allowed to receive write I/O's with the secondary LUN as an active target, but the primary array still maintains ownership and control over I/O ordering for the replication set at least in the sense that all writes to the secondary LUN are led by writes to the primary LUN.

In particular, when the secondary array receives a write I/O directed to the secondary LUN, it may send a copy of the write to the primary array via a replication channel while also holding the write in a fenced portion of its own cache. "Fenced" in this context means that the data is not treated as "written" yet and is not allowed to be processed by any normal cache management processes. For example, fenced writes cannot be read by other hosts, written to disk, etc., until they are released. The secondary array may wait to release the write until a write acknowledgement ("Ack") is received from the primary array. Releasing the write means admitting the write to the cache, which may include, for example, unfencing the portion of the cache that holds the write and allocating it to the secondary LUN or moving the write to another portion of the cache that is unfenced and allocated to the secondary LUN.

As soon as the secondary array receives the Ack from the primary array, the secondary array may release the fencing of the host write, respond back to the host, and send the write to its own backend to process. Thus, although the secondary array is able to receive and process writes from hosts targeting the secondary LUN, the primary array still leads the writes because the secondary array does not commit the writes until and unless the primary array has acknowledged back to it. From the perspective of a host, however, both the primary LUN and the secondary LUN are active targets for receiving both read and write I/O.

3—Example Benefits of Example Bidirectional Replication Technologies

As noted above, in examples disclosed herein, both the primary LUN of the primary array and the secondary LUN of the secondary array are presented to hosts as active targets for write I/O. In contrast, in many existing replication approaches the secondary LUN is completely read-only to hosts. By providing for the secondary LUN to be an active target for write I/O's, hosts that are local to the secondary array do not need to send their write I/O's to the potentially remote primary array.

In addition, in examples disclosed herein, the amount of cross-site communication between the primary side and the secondary side may be reduced, thus reducing congestion of communications links between the sites and improving the overall performance of the system. For example, in some approaches, a host may be allowed to send a write I/O to the secondary array and in response the secondary array may redirect or forward the I/O to the primary array, and then the primary array may process the write in the normal fashion including sending the write data back to the secondary array via a replication channel. In contrast, in examples disclosed herein the secondary array keeps the write data in its cache while waiting for write acknowledgment from the primary side, and thus the primary array does not need to send the write data back to the secondary array. Thus, in examples disclosed herein, the write data may be sent from one site to the other site at least one fewer time per host write I/O received at the secondary array.

In addition, in examples disclosed herein, the ability to have the secondary LUN be an active target for write I/O's may be provided without needing to implement complicated cache coherency schemes. In particular, in some alternative approaches, full Active-Active is provided by very complicated cache coherency schemes. Although such schemes may provide some of the same advantages as examples disclosed herein, they may do so at the cost of making the replication process very complicated. This increased complexity can also result in increased processing overhead for the replication process, and thus slightly poorer performance.

4—Example Storage System

FIG. 1 illustrates an example storage system 100. The example storage system 100 includes multiple storage arrays 10 that are communicably connected to one another via a replication channel 300. In FIG. 1, two storage arrays 10 are illustrated for simplicity, but any number of storage arrays 10 may be included in the storage system 100. In addition, hosts 200 may be communicably connected to the storage arrays 10 via communications channels 301 and 302.

Each of the storage arrays 10 (also referred to herein as "arrays 10") may include a number of storage devices 20, and a number of controllers 30. The controllers 30 may include processing circuitry 40 and a cache 60. In some examples, the controllers 30 may also include a memory 50 that stores replication instructions 510, which may be executed by the processing circuitry 40 to implement the operations of controllers 30 as described herein. It should be understood that the arrays 10 could each include any number of controllers 30; for example, multiple controllers 30 could be included in an array 10 to provide high-availability. However, for ease of description, the figures and the following description focus on a single controller 30 per array 10. In examples that include multiple controllers 30 per array 10, the operations described herein may be performed by one of the controllers 30, or multiple (or all) of the controllers 30.

The storage devices 20 each may be any electronic device that is capable of persistently storing digital data, such as hard disk drives, flash drives, non-volatile memory (NVM), tape drives, etc. The storage devices 20 do not need to all be the same type of device or have the same capacity. The number of storage devices 20 in each storage array 10 is not limited. The storage devices 20 are each communicably connected to the controller 30 of their storage array 10, such that the controller 30 may send the storage devices 20 local I/O requests (commands) and the storage devices 20 may return data and other replies to the controller 30.

The controller 30 is to manage access to the storage devices 20 of its array 10, including forming logical storage units (LUNs) from the storage space of the storage devices 20 and presenting the LUNs to hosts 200 as available targets for storage I/O. In particular, the controller 30 is to receive I/O from connected hosts 200 (hereinafter "host I/O"), generate local I/O requests to the storage devices 20 based on the host I/O, and return data received from the storage devices 20 and/or other replies (such as acknowledgments) to the hosts 200. In addition, the controller 30 implements the bi-directional replication functionality that is described herein. The controller 30 may also implement additional functionality, such as creating/managing a redundant array of independent disks (RAID), snapshotting, deduplication, compression, security, etc., but such additional functionality is not the focus of this disclosure.

The processing circuitry 40 of the controller 30 may be formed by a number of processors executing machine-readable instructions, dedicated hardware, or any combination of these.

Figure 2:
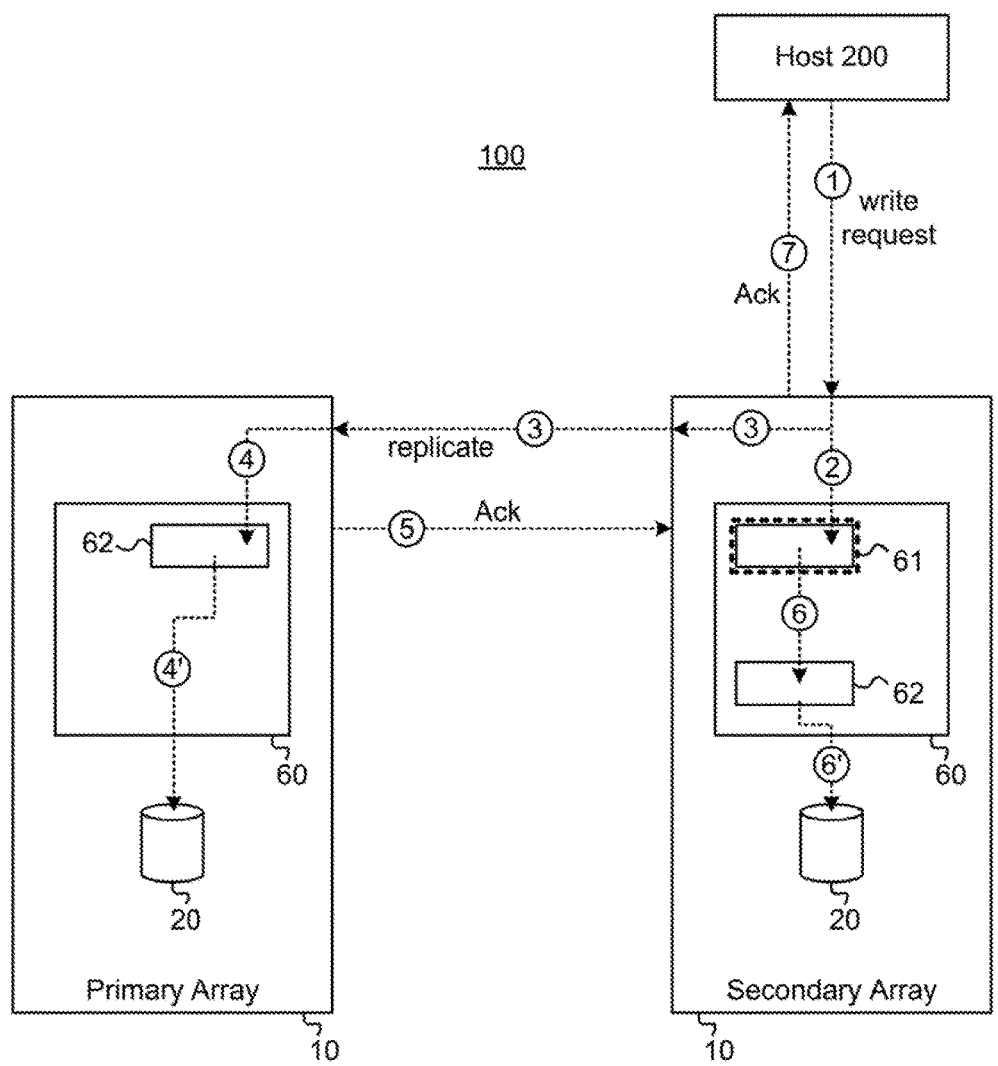
FIG. 2 illustrates example operations of an example bidirectional replication process.
Figure 3:
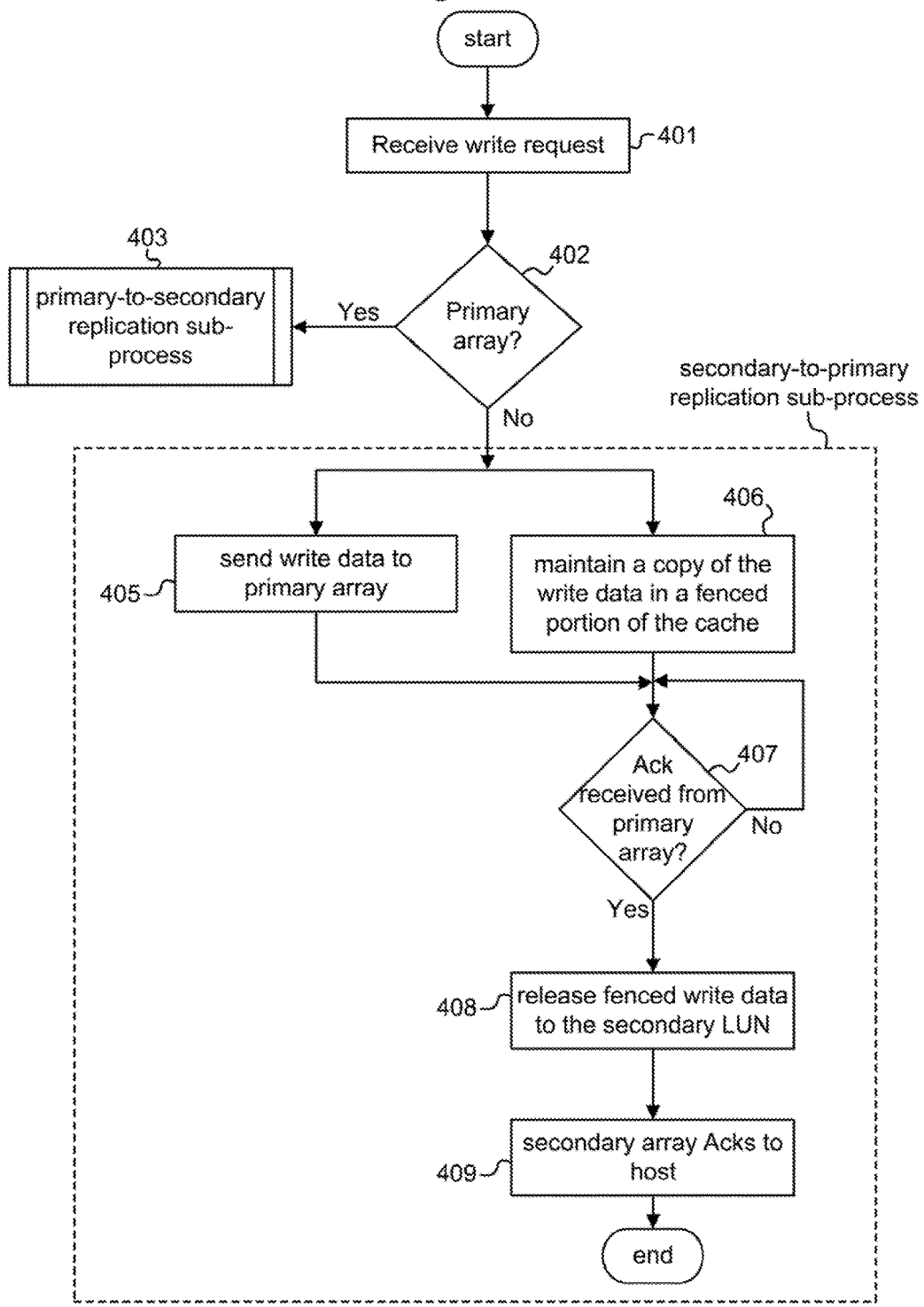
FIG. 3 is a process flow diagram illustrating an example bidirectional replication process.

For example, the processing circuitry 40 may be formed (in whole or in part) by a number of processors executing machine-readable instructions (stored on at least one machine-readable medium) that cause the processors to perform operations described herein, such as some or all of the bi-directional replication operations described herein and illustrated in FIGS. 2 and 3. As used herein, "processor" refers to any circuitry capable of executing machine-readable instructions, such as a central processing unit (CPU), a microprocessor, a microcontroller device, a digital signal processor (DSP), etc. In such examples in which the processing circuitry 40 is formed (in whole or in part) by processors executing machine-readable instructions, the controller 30 may also include the memory 50 to store the machine-readable instructions. The memory 50 may include any non-transitory machine-readable medium that is capable of storing digital data, including volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc. In some examples, any function described herein as performed by a controller may be performed by at least one processor executing instructions stored on at least one machine-readable medium.

As another example, the processing circuitry 40 may be formed (in whole or in part) by dedicated hardware that is designed to perform certain operations described herein, such as some or all of the bi-directional replication operations described herein and illustrated in FIGS. 2 and 3. As used herein, "dedicated hardware" may include application-specific integrated circuits (ASICs), complex programmable logic devices (CPLDs), field-programmable gate arrays (FPGAs), application-specific instruction set processors (ASIP), discrete logic circuits, network interface cards (NIC), adaptors (e.g., host adaptor), etc.

The controller 30 may also include a cache 60. The cache 60 may include storage space for caching data written to and/or read from the LUNs of the array 10. The storage space of the cache 60 may be provided by physical storage media, which may include any non-transitory machine readable medium that is capable of storing digital data, including volatile media such as random-access-memory (RAM) (e.g., DRAM, SRAM, etc.) and/or persistent (non-volatile) media such as non-volatile memory (e.g., NVRAM), battery-backed RAM, flash drives, etc.

In some examples, data may be considered as being committed to a LUN when it is admitted to the cache 60. As used herein, admitting data to the cache 60 means writing the data to a portion of the cache 60, such as a cache slot, that is allocated to a LUN (hereinafter "allocated portions"). As used herein, "writing data to a LUN" and "admitting data to a LUN" mean the same thing as "admitting data to the cache 60".

Data that is admitted to the cache 60 may eventually be written back ("flushed") to the storage devices 20 (if it is not already stored there) via a backend write I/O. While the admitted data is in the cache 60, a read directed to the data may be serviced directly from the cache 60 without needing to access the storage devices 20. Which admitted data is kept in the cache 60 and the timings at which admitted data is evicted from the cache may be determined by a cache management scheme implemented by the controller 30; any cache management scheme may be used in conjunction with the bi-directional replication described herein.

Some portions of the cache 60 might not be allocated to a LUN (hereinafter, "unallocated portions"), and writing data to such an unallocated portion of the cache 60 is not considered to be admitting the data to the cache 60 and the data so written is not considered to be committed to the LUN. Because data written to an unallocated portion of the cache 60 is not committed to the LUN, for example, data held in unallocated portions of the cache 60 may not be written back to the storage devices 20 until and unless it is admitted to the cached 60 (i.e., moved to an allocated portion of the cache 60).

Unallocated portions of the cache 60 may be used for various functions, such as holding transient I/O data. For example, some unallocated portions of the cache 60 may act as buffers for receiving and/or transmitting I/O to/from hosts 200 and/or other arrays 10. For example, an unallocated portion of the cache 60 may be used as a host I/O write buffer, which is to buffer write data received from a host 200. As another example, an unallocated portion of the cache 60 may be used as a replication transfer buffer, which is to buffer data to be sent to another storage array 10 via a replication channel as part of a replication process. As another example, a portion of the cache 60 may be used as a replication reception buffer, which is to buffer data received from another storage array 10 via a replication channel as part of a replication process.

In some examples, the roles and allocations of various portions of the cache 60 may be fixed. However, in other examples, the roles and allocations of various portions of the cache 60 may be changed dynamically as the array 10 operates. For example, a portion of the cache 60 may change between being an unallocated host I/O write buffer to being an unallocated replication transfer buffer to being allocated to a given LUN and back to being unallocated. In some examples, when a portion of the cache 60 that is storing data is reassigned to a new role or re-allocated to a new LUN while maintaining the same data, this may be considered to be a "logical move" of the data from one portion of the cache 60 to another portion of the cache 60. This is in contrast to a "physical move" of the data, in which the data is actually moved from one portion of the cache 60 to another distinct portion or out of the cache 60 entirely. Herein and in the appended claims, when it is said that data is "moved" from one portion of the cache to another portion, this should be understood to allow for either a logical move or a physical move, unless specifically indicated otherwise or logically contradictory.

In some examples, some or all of the physical storage space that constitutes the cache 60 may be provided by physical storage device(s) that are distinct from the memory 50 and/or the storage devices 20. In other examples, some or all of the physical storage space that constitutes the cache 60 may be provided by the same physical storage device(s) as the memory 50 and/or storage devices 20. For example, storage space from one or more of the storage devices 20 may be reserved for use as part of the cache 60; this may be best suited, for example, to storage devices 20 that have fast access speeds, such as NVRAM or flash disks (SSDs). As another example, storage space from the storage medium that forms the memory 50 (e.g., RAM) may be reserved for use as part of the cache 60. In some examples, the cache 60 may include different tiers, which may be, for example, formed from different types of physical storage media (e.g., a high speed tier formed from RAM and a slightly lower speed tier formed from flash drives).

There may be one or more intermediaries (not illustrated) interposed in the communications channels between the controller 30 and the storage media of the storage devices 20, which are intentionally omitted from the Figures for the sake of clarity. For example, the intermediaries may include a device driver, a networking device such as a switch or a router, an internal controller of a storage device 20, an adaptor, and so on. In particular, in some examples, some or all of the storage devices 20 may include their own internal controller (e.g., a disk controller) (not illustrated) that may control the internal operations of the storage device 20, such as maintaining mappings and other metadata, accessing the storage media, etc.

In some examples, all of the components of the storage array 10 are part of a single device (i.e., housed within the same chassis or enclosure), such as a server, personal computer, storage appliance, composable infrastructure appliance, converged (or hyperconverged) appliance, etc. In other examples, some of the components of the storage array 10 may be part of the same integrated device, while other components may be external to that device—for example, the storage devices 20 may be external to a chassis that houses the controller(s) 30.

The replication channel 300 may include any communications channel by which the storage arrays 10 may communicate with one another. For example, the replication channel 300 may include communications media (e.g., electrical cables, optical fiber cables, etc.) and a number of network devices (e.g., switches, bridges, hubs, routers, etc.). For example, the replication channel 300 may include public networks (such as the internet), private networks (such as an intranet), or any combination of these. The replication channel 300 may use any transport protocol, such as protocols from the SCSI family (e.g., Internet SCIS (iSCSI), Fiber Channel Protocol (FCP), SCSI RDMA Protocol (SRP), etc.), Transmission Control Protocol (TCP), Internet Protocol (IP), InfiniBand (IB), iWARP, RDMA over Converged Ethernet (RoCE), etc. In some examples, the replication channel 300 may be reserved specifically for replication between the storage arrays 10. In other examples, the replication channel 300 may be a general purpose link that carries non-replication related messages between the storage arrays 10 in addition to replication related messages.

In some examples, the storage arrays 10 may be disposed in different fault domains to reduce the chances of simultaneous failure. For example, the storage arrays 10 may be disposed in different racks, different buildings, different sites, different geographic regions, etc.

The communications channels 301 and 302 may include any communications channel by which the storage arrays 10 may communicate with hosts 200. For example, the communications channels 301 and 302 may include communications media (e.g., electrical cables, optical fiber cables, etc.) and a number of network devices (e.g., switches, bridges, hubs, routers, etc.). For example, the communications channels 301 and 302 may include public networks (such as the internet), private networks (such as an intranet), or any combination of these. The communications channels 301 and 302 may use any transport protocol, such as protocols from the SCSI family (e.g., Internet SCIS (iSCSI), Fiber Channel Protocol (FCP), etc.).

5—Example Bidirectional Replication Processes

FIGS. 2 and 3 illustrate example bidirectional replication processes/methods. The example processes may be performed, for example, by controllers of storage arrays, such as the controllers 30 of the example storage arrays 10 described above. For example, the example processes may be embodied (in whole or in part) in machine readable instructions that, when executed by a processor of the controller, cause the controller to perform (some or all of) the operations of the example processes. As another example, the example processes may be embodied (in whole or in part) in logic circuits of dedicated hardware of the controller that perform (some or all of) the operations of the example processes. The following description of the example processes will make reference to the example storage arrays 10 described above for convenience, but it should be understood that the processes are not necessarily limited to the example storage arrays 10 described above.

In certain examples, the example bidirectional replication process includes a primary-to-secondary replication sub-process and a secondary-to-primary replication sub-process. The primary-to-secondary replication sub-process may be performed when a storage array 10 receives a write request from a host 200 directed to a LUN of the array 10 that is the primary LUN of a replication set. In other words, the primary-to-secondary replication sub-process may be performed when the storage array 10 that receives a write request is the primary array 10 in relation to that request. The secondary-to-primary replication sub-process may be performed when a storage array 10 receives a write request from a host 200 directed to a LUN of the array 10 that is the secondary LUN of a replication set. In other words, the secondary-to-primary replication sub-process may be performed when the storage array 10 that receives a write request is the secondary array 10 in relation to that request.

For example, in block 401 of FIG. 3, the controller 30 may receive a write request from a host 200 (operation #1 in FIG. 2). The process may then continue to block 402.

In block 402, the controller 30 may determine whether it is the primary array 10 in relation to the received write request. For example, if the write is addressed to a LUN of the storage array 10 that is the primary LUN of a replication set, then the array 10 is the primary array 10 in relation to the write. On the other hand, if the write is addressed to a LUN of the storage array 10 that is one of the secondary LUNs of a replication, then the array 10 is the secondary array 10 in relation to the write. If the array 10 is the primary array 10 (block 402=Yes), then the process continues to block 403 and the primary-to-secondary replication sub-process is performed. If the array 10 is the secondary array 10 (block 402=No), then the process continues to blocks 404 and 405 and the secondary-to-primary replication sub-process is performed.

In block 403, the primary-to-secondary replication sub-process is performed. The primary-to-secondary replication sub-process may be similar to existing replication processes, and thus is not illustrated in detail in the Figures. For example, when the primary array 10 receives the write requests, it may admit the write data to the primary LUN (for example, by moving a copy of the data to a portion of its cache 60 that is allocated to the primary LUN) and send a copy of the write data via a replication channel 300 to the secondary array 10 for replication to the secondary LUN. The primary array 10 may admit the write data and send a copy of the write data to the secondary array 10 simultaneously or may perform these operations in any order. The secondary array 10 receives the copy of the write data from the primary array 10, admits the write data to the secondary LUN, and sends a write acknowledgement (Ack) back to the primary array 10. Upon receiving the Ack from the secondary array 10, the primary array 10 may send a write acknowledgement back to the host 200 that send the write. The primary-to-secondary replication sub-process may then end.

As noted above, when the storage array 10 that received the host I/O is not the primary array 10 (block 402=No), then the secondary-to-primary replication sub-process may be performed. In particular, the secondary-to-primary replication sub-process begins by performing blocks 405 and 406. In some examples, the operations of blocks 405 and 406 may be performed simultaneously. In some examples, the operations of block 405 may be performed before those of block 406. In some examples, the operations of block 406 may be performed before those of block 405.

In block 405, the secondary array 10 sends a copy of the write data of the received write request to the primary array 10 via the replication channel 300 (operation #3 in FIG. 2). Along with the write data, the secondary array 10 may also send information to the primary array 10 identifying the primary LUN to which the write is directed.

In block 406, the secondary array 10 maintains a copy of the write data of the received write in a fenced portion 61 of its cache 60 (operation #2 in FIG. 2). In particular, while the portion 61 of the cache 60 remains fenced, the secondary array 10 treats the data within the portion 61 as not yet having been written or admitted to any LUN, and does not allow the data to be processed by any normal cache management processes. For example, the secondary array 10 may prevent the fenced write data from being: read by hosts 200, written to the storage devices 20, deduplicated, compressed, mirrored to another controller 30 of the array 10 (assuming a high-availability storage array 10 with multiple controllers 30), etc.

Upon receiving the write data from the secondary array 10, the primary array 10 may admit the data to the primary LUN (operation #4 in FIG. 2), and send a write acknowledgement to the secondary array (operation #5 in FIG. 2). The admitting of the data to the primary LUN may include, for example, the primary array 10 writing the data to a portion 62 of the cache 60 that is allocated to the primary LUN. The data may then be subjected to normal cache processes, including eventually being written back to one or more of the storage devices 20 (operation #4' in FIG. 2). The Ack may be sent by the primary array 10 back to the secondary array 10 (operation #5) as soon as the process of admitting the write data to the primary LUN (operation #4) has begun or at any time thereafter.

In block 407, the secondary array 10 determines whether a write acknowledgement (Ack) has been received from the primary array, the Ack being for the write data that was sent from the secondary array 10 to the primary array 10 in block 405. If an Ack has been received (block 407=Yes), then the process continues to block 408. If an Ack has not yet been received (block 407=No), then the process loops back to block 407 and the fenced portion 61 of the cache 60 containing the write data continues to be fenced. Thus, the write data is maintained in the fenced portion 61 of the cache 60 of the secondary array 10 until an Ack is received from the primary array 10.

In block 408, in response to receiving the Ack from the primary array 10, the secondary array 10 releases the write data in the portion 61 of the cache 60 to the secondary LUN (operation #6 in FIG. 2). Releasing the write data to the secondary LUN means admitting the write data to the secondary LUN by moving the write data to an unfenced portion 62 of the cache 60 that is allocated to the secondary LUN. As noted above, moving the write data from the fenced portion 61 to the unfenced portion 62 allocated to the secondary LUN may include either physically moving the write data to a different portion 62 of the cache 60 or logically moving the write data by unfencing and reassigning/allocating the portion 61 to the secondary LUN (whereupon the fenced portion 61 may be considered as the unfenced portion 62). The data may then be subjected to normal cache processes, including eventually being written back to one or more of the storage devices 20 (operation #6' in FIG. 2).

In block 409, the secondary array sends a write acknowledgment (Ack) back to the host 200 that send the write I/O. The process then ends.

Because the secondary array 10 does not release the write data from the fenced portion 61 to the secondary LUN until and unless the primary array 10 has sent a write acknowledgment, the primary array 10 is still able to lead the writes to the replication set. However, from the perspective of a host 200, both the primary LUN and the secondary LUN are active targets for receiving both read and write I/O.

Although not illustrated, there may be exceptions included in the process that may result in aborting the process in the event of an error or failure and beginning an error handling and/or recover process (described in greater detail below). For example, a timer may be kept from when the write data is sent to the primary array 10 in block 405, and when the timer exceeds a specified threshold (timeout value) without an Ack being received, then the loop back to block 407 may be broken and an error handling process (not illustrated) may be executed. In addition, failures such as power failure may result in aborting the process and beginning error handling and/or recovery processes.

In the descriptions above, it is assumed for ease of description that the Ack that the secondary array is waiting for indicates a good status; however, as described in the Error Handling and Consistency After Failure section below, it is also possible for an Ack to indicate an error status. In the event that an Ack indicates an error status, error handling procedures may be invoked as described below.

6—Example Dynamic Primary/Secondary Assignment

Because in examples described herein both the primary LUN and the secondary LUN(s) may be active targets for write I/O, it is possible for hosts 200 that want to access a replication set to be distributed across the primary array and the secondary array, rather than it being necessary for all of the hosts to be assigned to the primary array. This distribution of hosts 200 may be desirable in various context, but might result in the secondary array 10 receiving a large number of write I/Os. If the amount of write I/O received by the secondary array 10 becomes too large, performance may suffer, since the secondary array 10's holding of host write I/O in the fenced portion of its cache 60 can result in added pressure on its cache 60. Thus, in some contexts, it may be desirable to control the proportion of writes to a replication set that are received by the primary array 10 versus the secondary array 10.

Accordingly, in some examples, the storage system 100 may be configured to set and dynamically change the primary and secondary status of the LUNs of a replication set. In particular, the controller 30 of one storage array 10 (or the controllers 30 of multiple storage arrays 10 in cooperation) may monitor which LUNs are being targeted by host I/O and how frequently, and may decide whether to change the primary LUN of a given replication set based on this.

For example, the controllers 30 may compare the number of host write I/O's that are directed to the current primary LUN (hereinafter "primary writes") of a replication set to the number of host write I/O's that are directed to the current secondary LUN (hereinafter "secondary writes") of the same replication set. In one approach, if the number of secondary writes in a specified time period exceeds the number of primary writes in the same time period by a specified threshold, then the controllers 30 may decide to change which LUN is the primary LUN for the replication set. In another approach, if a moving average number of secondary writes exceeds a moving average number of primary writes by a specified threshold, then the controllers 30 may decide to change which LUN is the primary LUN for the replication group.

In some examples, when bidirectional replication is enabled between two storage arrays 10, the storage arrays 10 may initially split LUN ownership such that some of the LUNs on each array are the primary LUNs of their respective replication sets and some of the LUNs on each array are the secondary LUNs of their respective replication sets. For example, an initial split may be 50% primary LUNs and 50% secondary LUNs (or as close to this as possible). The arrays 10 may then dynamically adjust the allocation of primary and secondary assignments based on the actual workloads they experience.

7—Error Handling and Consistency after Failure

Error handling for the replication process may be handled, for example, as follows. The storage arrays 10 each may hold transient host I/O's for a period of time, for example in various buffers, before transferring the I/O's to their main cache 60.

If the primary array 10 (in a primary-to-secondary replication) or the secondary storage array 10 (in a secondary-to-primary replication) receives an acknowledgment (Ack) with good status indicated from the other array 10 within a specified time, then the replication is a success and the transient write I/O is purged from the buffer upon the Ack arrival.

If the primary array 10 (in a primary-to-secondary replication) or the secondary storage array 10 (in a secondary-to-primary replication) receives an Ack with an error status indicated from the other array 10 within a specified time, then the transient write I/O may be held in the buffer. In some examples, depending on the type of error reported, retransmission(s) of the replication I/O may be performed before a preset timeout value is expired. In other examples, depending on the type of error, a failure state may be indicated.

If the primary array 10 (in a primary-to-secondary replication) or the secondary storage array 10 (in a secondary-to-primary replication) does not receive an Ack from the other array 10 within a specified time and if the replication channel 300 is indicated to be "up" (e.g., functional, active, connected), then the transient write I/O may be held in the buffer. Retransmission(s) of the replication I/O may be performed (for example, at specified intervals) before a preset timeout value is expired. Upon expiration of the timeout value, a failure state may be indicated.

Upon indication of a failure state, the storage arrays 10 can determine which array 10 can maintain read and write I/O access and which array 10 needs to block access until a recovery process succeeds in restoring replication communications and status. The single active array 10 can track the data that is written during the replication failure state to be utilized by a future recovery/resync operation when replication status is restored.

The above-described examples allow both primary and secondary arrays 10 to accept write I/O as an active target, even though in each array 10 the I/O replication scheduling is different. As described above, the primary array 10 maintains control of the LUN and the I/O ordering given that it's always leading the replication process. In such an arrangement, a question can arise about consistency between the primary LUN and the secondary LUN in the case of combined link failures between the host 200 and its target array 10 and between the arrays 10 and a power failure scenario. In particular, consider the case in which the secondary array 10 receives a write I/O for a secondary LUN, sends the replication I/O to the primary array 10, and then, before the secondary array 10 has committed the I/O to its cache 60, the secondary array 10 becomes isolated from host 200 and the primary array 10 due to link failures and then a power loss occurs for the secondary array 10. In a case like this, the received write is not considered to be an I/O to the secondary LUN at this time, and thus if the secondary array 10 is rebooted its backend data will not match the primary array 10.

Accordingly, if it is desired to ensure full consistency between the arrays 10 throughout such failure cases, in some examples, the secondary array 10 may maintain a list of the replication I/O's that are being held in buffer while being transmitted to the primary array 10 and not yet committed by the secondary array 10. Upon rebooting, the secondary array 10 may then pull the I/O's on this list from the primary array 10, allowing the primary and secondary LUNs to be made consistent. This list of in-transit replication I/O's may be stored in a nonvolatile location to enable recovery after reboots.

8—Example Processor Executable Instructions

Figure 4:
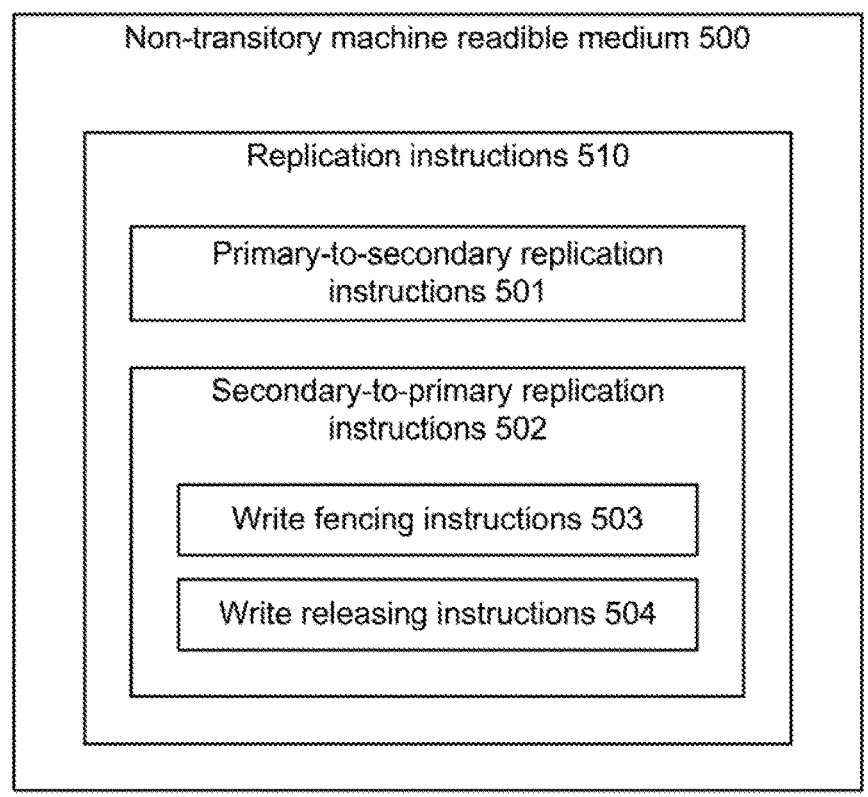
FIG. 4 illustrates an example non-transitory machine readable medium storing example replication instructions.

FIG. 4 illustrates example processor executable instructions stored on a non-transitory machine readable medium 500. In particular, replication instructions 510 are stored on the medium 500.

The replication instructions 510 may include instructions to perform any or all of the operations described above, including, for example, any of the example processes illustrated in FIGS. 2-3.

For example, the replication instructions 510 may include primary-to-secondary replication instructions 501 and secondary-to-primary replication instructions 502. The replication instructions 510 may include instructions to execute the primary-to-secondary replication instructions 501 in response to receiving a host write I/O directed to a replication set for which the storage array is the primary array, and instructions to execute the secondary-to-primary replication instructions 502 in response to receiving a host write I/O directed to a replication set for which the storage array is a secondary array The primary-to-secondary replication instructions 501 may include instructions to implement remote copy replication from a primary LUN of a first storage array to a secondary LUN of a second storage array. For example, the primary-to-secondary replication instructions 501 may include instructions to perform operations corresponding to the primary-to-secondary replication sub-process described above in relation to FIG. 3.

The secondary-to-primary replication instructions 502 may include write fencing instructions 503 and write releasing instructions 504. For example, the secondary-to-primary replication instructions 502 may include instructions to perform operations corresponding to the secondary-to-primary replication sub-process described above in relation to FIG. 3

The write fencing instructions 503 may include instructions to, in response to receiving at a secondary storage array a write that is directed to a primary LUN from a host, cause the secondary storage array to send write data of the write to a primary storage array while maintaining a copy of the write data in a fenced portion of a cache of the second storage array. For example, the write fencing instructions 503 may include instructions to perform the operations described above in relation to blocks 405 and 406 of FIG. 3 (e.g., operations #2 and #3 in FIG. 2).

The write releasing instructions 504 may include instructions to cause the secondary array to wait to release the copy of the write data to the secondary LUN (e.g., unfence the data and admit it to the cache) until a write acknowledgment is received from the primary storage array. The write releasing instructions 504 may also include instructions to cause the secondary array to acknowledge the write to the host upon releasing the copy of the write data to the secondary LUN. For example, the write releasing instructions 504 may include instructions to perform the operations described above in relation to blocks 407-409 of FIG. 3 (e.g., operations #6 and #7 in FIG. 2).

9—Other Definitions

As used herein, a "computer" is any electronic system that includes a processor and that is capable of executing machine-readable instructions, including, for example, a server, certain storage arrays, a composable-infrastructure appliance, a converged (or hyperconverged) appliance, a rack-scale system, a personal computer, a laptop computer, a smartphone, a tablet, etc.

As used herein, to "provide" an item means to have possession of and/or control over the item. This may include, for example, forming (or assembling) some or all of the item from its constituent materials and/or, obtaining possession of and/or control over an already-formed item.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of active optical devices, wherein the active optical devices . . ." could encompass both one active optical device and multiple active optical devices, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form and subsequent references to the item may include the definite pronoun "the" for grammatical consistency, but this does not necessarily mean that only one item is being referred to. Thus, for example, a phrase such as "an optical socket, wherein the optical socket . . ." could encompass both one optical socket and multiple optical sockets, notwithstanding the use of the singular form and the definite pronoun.

Occasionally the phrase "and/or" is used herein in conjunction with a list of items. This phrase means that any combination of items in the list—from a single item to all of the items and any permutation in between—may be included. Thus, for example, "A, B, and/or C" means "one of: {A}, {B}, {C}, {A, B}, {A, C}, {C, B}, and {A, C, B}".

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

While the above disclosure has been shown and described with reference to the foregoing examples, it should be understood that other forms, details, and implementations may be made without departing from the spirit and scope of this disclosure.

What is claimed is:

1. A data storage system comprising:
    a first storage array comprising a first logical storage volume ("LUN"); and
    a second storage array comprising a second LUN,
    wherein the first and second storage arrays are to implement replication from the first LUN as a primary LUN to the second LUN as a secondary LUN, and
    the second storage array is to, in response to receiving from a host a write that is directed to the second LUN:
        send write data of the write to the first storage array;
        hold a copy of the write data in a fenced portion of a cache of the second storage array until a write acknowledgment is received from the first storage array; and
        in response to receiving the write acknowledgment from the first storage array, admit the write data to the second LUN.

2. The data storage system of claim 1,
    wherein the first storage array is to, in response to receiving the write data from the second storage array, admit the write data to the first LUN and send the write acknowledgement to the second storage array.

3. The data storage system of claim 2,
    wherein the first storage array is to refrain from replicating the write data received from the second storage array to the second storage array.

4. The data storage system of claim 1,
    wherein the implementing replication from the first LUN to the second LUN includes:
        the first storage array, in response to receiving from a second host a second write that is directed to the first LUN, sending write data of the second write to the second storage array and acknowledging the second write to the second host, and
        the second storage array admitting the write data of the second write to the second LUN and acknowledging the second write to the first storage array.

5. The data storage system of claim 4,
    wherein in the implementing replication from the first LUN to the second LUN, the second storage array admits the write data of the second write to the second LUN without waiting for any acknowledgment from the first storage array.

6. The data storage system of claim 4,
    wherein in the implementing replication from the first LUN to the second LUN, the first storage array admits the write data of the second write to the first LUN without waiting for any acknowledgment from the second storage array.

7. The data storage system of claim 1,
the second storage array is to acknowledge the write to the host upon releasing the copy of the write data to the second LUN.

8. The data storage system of claim 1,
wherein the first storage array is located at a first site and the second storage array is located at a second site that is remote from the first site.

9. The data storage system of claim 1,
wherein the first and second storage arrays are to dynamically change an allocation of primary and secondary statuses among their respective LUNs based on respective numbers of host writes directed to LUNs having a primary status and respective numbers of host writes directed to LUNs having a secondary status.

10. A storage array, comprising:
a number of storage devices; and
a storage controller comprising processing circuitry and a cache;
wherein the storage controller is to:
   participate in implementing replication from a first LUN of an other storage array as a primary LUN to a second LUN of the storage array as a secondary LUN; and
   in response to receiving from a host a write that is directed to the second LUN:
      send write data of the write to the other storage array while maintaining a copy of the write data in a fenced portion of the cache; and
      wait to release the copy of the write data to the second LUN until a write acknowledgment is received from the other storage array.

11. The storage array of claim 10,
wherein the storage controller is to acknowledge the write to the host upon releasing the copy of the write data to the second LUN.

12. The storage array of claim 10,
wherein the storage array is to dynamically change an allocation of primary and secondary statuses among its LUNs based on respective numbers of host writes directed to its LUNs having a primary status and respective numbers of host writes directed to its LUNs having a secondary status.

13. The storage array of claim 10,
wherein in participating in implementing replication from the first LUN to the second LUN, the storage array admits write data received for replication from the other storage array to the second LUN without waiting for any acknowledgment from the other storage array.

14. A non-transitory machine readable medium comprising processor-executable instructions for implementing bidirectional replication between a primary LUN of a first storage array and a secondary LUN of a second storage array, including:
instructions to, in response to the second storage array receiving from a host a write that is directed to the secondary LUN, cause the second storage array to:
   send write data of the write to the first storage array while maintaining a copy of the write data in a fenced portion of a cache of the second storage array; and
   wait to release the copy of the write data to the secondary LUN until a write acknowledgment is received from the first storage array.

15. The non-transitory machine readable medium of claim 14, wherein the processor-executable instructions further include:
instructions cause the second storage array to acknowledge the write to the host upon releasing the copy of the write data to the secondary LUN.

16. The non-transitory machine readable medium of claim 14, wherein the processor-executable instructions further include:
instructions to cause the second storage array to dynamically change an allocation of primary and secondary statuses among its LUNs based on respective numbers of host writes directed to its LUNs having a primary status and respective numbers of host writes directed to its LUNs having a secondary status.

17. The non-transitory machine readable medium of claim 14, wherein the processor-executable instructions further include:
instructions to cause the second storage array to participate in implementing replication from the primary LUN to the secondary LUN by admitting write data received for replication from the first storage array to the second LUN without waiting for any acknowledgment from the first storage array.

* * * * *